(12) United States Patent
Noridomi et al.

(10) Patent No.: US 7,676,055 B2
(45) Date of Patent: Mar. 9, 2010

(54) INFORMATION-DETECTING APPARATUS AND METHOD

(75) Inventors: Kenichi Noridomi, Fukuoka (JP); Hisashi Inoue, Fukuoka (JP); Masataka Ejima, Osaka (JP)

(73) Assignee: Panasonic Corporation, Osaka (JP)

( * ) Notice: Subject to any disclaimer, the term of this patent is extended or adjusted under 35 U.S.C. 154(b) by 937 days.

(21) Appl. No.: 10/582,964

(22) PCT Filed: Oct. 7, 2005

(86) PCT No.: PCT/JP2005/018912

§ 371 (c)(1),
(2), (4) Date: Jun. 15, 2006

(87) PCT Pub. No.: WO2006/041145

PCT Pub. Date: Apr. 20, 2006

(65) Prior Publication Data

US 2008/0273627 A1    Nov. 6, 2008

(30) Foreign Application Priority Data

Oct. 15, 2004    (JP)    ............................ 2004-301147

(51) Int. Cl.
*G06K 9/00* (2006.01)
*H04B 1/66* (2006.01)
(52) U.S. Cl. ...................... 382/100; 375/240
(58) Field of Classification Search ................. 382/100, 382/232, 240; 380/51, 54, 210, 252, 287; 370/522–529; 348/461, 463; 283/72, 74–81, 283/85, 93; 358/3.28; 375/240
See application file for complete search history.

(56) References Cited

U.S. PATENT DOCUMENTS 6,993,148 B1 *    1/2006    Miyashita et al. ........... 382/100

(Continued)

FOREIGN PATENT DOCUMENTS

JP    2000-228720    8/2000

OTHER PUBLICATIONS

Daniel Gruhl et al., "Information Hiding to Foil the Casual Counterfeiter", Lecture Notes in Computer Science, Proceedings of the Second International Workshop on Information Hiding, vol. 1525, 1998, pp. 1-15, Springer-Verlag, London, UK.

(Continued)

*Primary Examiner*—Abolfazl Tabatabai
(74) *Attorney, Agent, or Firm*—Wenderoth, Lind & Ponack, L.L.P.

(57) ABSTRACT

An information-detecting apparatus (1) including a receiving unit (3) operable to receive digital data (2) that includes several pieces of element data, in which a change amount is imparted to a value of each of first and second element data among the several pieces of element data, a first selecting unit (4) operable to select, as target data (6), a data set that includes the first and second element data, a second selecting unit (5) operable to select, as neighboring data (7), element data in proximity to each of the first and second element data, a calculating unit (8) operable to calculate, based on both of the target data (6) and the neighboring data (7), the change amount imparted to each of the first and second element data, and a detecting unit (10) operable to detect the additional information in accordance with the change amount.

19 Claims, 10 Drawing Sheets

U.S. PATENT DOCUMENTS 7,142,689 B2 * 11/2006 Hayashi et al. ............. 382/100

OTHER PUBLICATIONS

W. Bender et al., "Techniques for data hiding", IBM Systems Journal, vol. 35, No. 3-4, 1996, pp. 313-336.

Ryo Sugihara, "Practical Capacity of Digital Watermarks", IBM Tokyo Research Laboratory, 'Online! Apr. 25-27, 2001, 4th International Information Hiding Workshop, Pittsburgh, Retrieved from the Internet: URL:http://www.research.ibm.com/trl/projects/RightsManagement/datahiding/paper/Sugiryo_IH2001SIlide.pdf> retrieved on Dec. 13, 2005.

In-Kwon Yeo et al., "Modified Patchwork Algorithm: A Novel Audio Watermarking Scheme", IEEE Transactions on Speech and Audio Processing, vol. 11, No. 4, 2003, pp. 381-386.

Kineo Matsui, "Fundamentals of Electronic Watermark", published by Morikita publishing company, 1998, pp. 91-94 along with partial English translation.

* cited by examiner

INFORMATION-DETECTING APPARATUS AND METHOD

TECHNICAL FIELD

The present invention relates to an information-detecting apparatus and method operable to detect additional information as typified by digital watermarks embedded in digital data and, in particular, image data.

BACKGROUND ART

In recent years, digital content such as digitized audio and video data has been prevalent in great numbers. The digital content is easy to provide a faithful reproduction of original content, and it is an issue to protect the copyright of the digital content.

A "digital watermark" is used as one of countermeasures to protect the copyright of the digital content. The digital watermark is an art operable to embed data into image data in such a manner as to prevent human beings to perceive degradation in image, and operable to detect the embedded data.

Reference No. 1 ("The Basic of Digital Watermarks" by Koushio MATSUI, pages 91-94, published by Morikita Shuppan, 1998-edition) discloses a statistic-based patchwork system as an example of the digital watermark. The patchwork system is now described with reference to FIG. 11. FIG. 11 is a pattern diagram showing a prior art digital watermark system.

Initially, the following discusses the embedment of additional information. As illustrated in FIG. 11, any two pieces of pixel data (ai, bi) included in image data are selected as a data set. The two pieces of pixel data as included in the data set are changed in data value, thereby embedding additional information into the image data.

The additional information is one-bit information having a value of either "1" or "0". One of the two pieces of pixel data (ai, bi) is increased in data value by any amount of $\alpha$ ($\alpha$>0) in accordance with the value of the one-bit information, while the other is decreased in data value by the amount of a When the additional information includes multi-bit information, then several data sets are specified from image data, thereby repeating the same processing at each of the data sets for each piece of one-bit information. When the one-bit information embedded in one of the data sets has the value of "1", then the pixel data "ai" is increased by the amount of $\alpha$, but the pixel data "bi" is decreased thereby. Conversely, for one-bit information having the value of "0", the pixel data "ai" is decreased by the amount of $\alpha$, but the pixel data "bi" is increased thereby.

In this way, the additional information is embedded into the image data. Alternatively, a piece of bit information, which forms part of the additional information, may be embedded into several data sets.

The following discusses the detection of the additional information.

To detect the additional information, statistic characters of nature images are used. Initially, in image data free of the embedded additional information, a value of a difference between two pieces of pixel data (ai, bi) included in a data set is calculated. At this time, all values of differences between the pixel data (ai, bi) in all of the data sets are calculated to provide a sum "Sn" of all of difference values. (Equation 1) is an expression to calculate the sum "Sn" of the difference values.

$$S_n = \sum_{i=1}^{n}(a_i - b_i) \approx 0 \quad \text{(Equation 1)}$$

As described by (Equation 1), an increase in number "n" of the data sets allows the sum Sn to approach the value of "0".

Now, assume that one-bit information having the value of "1" is embedded into the pixel data (ai, bi) included in each of the data sets, thereby providing pixel data (ai', bi'). (Equation 2) illustrates an expression to calculate a sum Sn' of values of differences between several pieces of the pixel data (ai', bi').

$$\begin{aligned} S'_n &= \sum_{i=1}^{n}(a'_i - b'_i) \\ &= \sum_{i=1}^{n}\{(a_i + \alpha) - (b_i - \alpha)\} \\ &= \sum_{i=1}^{n}\{(a_i - b_i) + 2\alpha\} \approx 2\alpha n \end{aligned} \quad \text{(Equation 2)}$$

As described by (Equation 2), an increase in number "n" of the data sets allows the sum Sn' to approach the value of $2\alpha n$. This means that a change amount $\alpha$ is detected, which has been imparted to the pixel data (ai, bi) to embed the additional information. In this instance, the calculated $2\alpha n$ is a positive value, and the embedded one-bit information is determined as having the value of "1". Conversely, when the one-bit information having the value of "0" is embedded, then the sum Sn' approaches a negative value of "$-2\alpha n$". In this way, the value of the embedded bit information is determined based on either the negative or the positive of the sum Sn' of values of differences between several pieces of the pixel data (ai', bi') included in all of the data sets that have the additional information embedded therein.

Reference No. 2 (published Japanese Patent Application Laid-Open No. 2000-228720) discloses another art for the detection of the additional information.

FIG. 12 is a pattern diagram illustrating the determination of additional information, as disclosed by Reference No. 2.

According to Reference No. 2, when one-bit information of additional information is embedded in a piece of pixel data, which forms part of image data, then the additional information is detected based on both of the pixel data having the additional information embedded therein, and neighboring pixel data in the neighborhood thereof.

As illustrated in FIG. 12, the additional information includes fifty-bit information, in which each bit is embedded at a corresponding spot of positions Nos. 1 to 100. The first to fiftieth bit are embedded at respective spots of positions No. 1 to No. 50, and at those of positions No. 51 to No. 100. More specifically, the first bit of the additional information is embedded at two spots, i.e., positions No. 1 and No. 51.

In short, the additional information is detected based on pixel data at position No. 1 and neighboring pixel data in the neighborhood of the pixel data at position No. 1, and pixel data at position No. 51 and neighboring pixel data in the neighborhood of the pixel data at position No. 51. The detection is repeated until the last position No. 100 is reached, thereby detecting the additional information that includes the fifty-bit information.

However, a problem with the information detection according to Reference No. 1 is that it is difficult to detect the change amount with accuracy because the sum Sn' does not approach the value of either "2αn" or "−2αn" when there is a small correlation between the two pieces of pixel data (ai, bi) having the additional information embedded therein. The inaccurate detection of the change amount results in inaccurate detection of the additional information as well. Another problem incident to Reference No. 1 is that additional information having only very small capacity can be embedded into a piece of image data because a value of the number of "n" must be increased to detect a change amount "α" precisely.

Meanwhile, according to the information detection as disclosed by Reference No. 2, a gang of change amounts must be embedded into a piece of pixel data. Such a requirement forces the piece of pixel data to be considerably changed in data value, with a concomitant problem that images are susceptible to degradation.

In view of the above, an object of the present invention is to provide an information-detecting apparatus and method operable to detect additional information with increased accuracy from digital data having a large amount of additional information embedded therein, while avoiding degradation in images.

DISCLOSURE OF THE INVENTION

A first aspect of the present invention provides an information-detecting apparatus comprising: a receiving unit operable to receive digital data that includes several pieces of element data, in which a change amount is imparted to a value of each of first element data and second element data among the several pieces of element data, thereby embedding additional information into both of the first element data and the second element data; a first selecting unit operable to select, as target data, a data set that includes the first element data and the second element data; a second selecting unit operable to select, as neighboring data, element data in proximity to each of the first element data and the second element data; a calculating unit operable to calculate, based on both of the target data and the neighboring data, the change amount imparted to each of the first element data and the second element data; and a detecting unit operable to detect the additional information in accordance with the change amount.

The above structure allows the additional information embedded in the digital data to be detected therefrom with increased accuracy.

A second aspect of the present invention provides an information-detecting apparatus in which when the digital data is image data, each of the first element data and the second element data comprises either a piece of pixel data or several pieces of pixel data.

Similarly, the above structure allows the additional information embedded in the image data to be detected therefrom with increased accuracy.

A third aspect of the present invention provides an information-detecting apparatus in which the additional information comprises a digital watermark.

The above structure allows digital watermarks for copyright protection to be detected with increased accuracy. As a result, the copyright of the digital data is properly protected.

A fourth aspect of the present invention provides an information-detecting apparatus in which the calculating unit calculates, as a first difference value, a value of a difference in data value between the first element data and the element data in proximity to the first element data, which the calculating unit calculates, as a second difference value, a value of a difference in data value between the second element data and the element data in proximity to the second element data, and which the calculating unit calculates, as the change amount, a value of a difference between the first difference value and the second difference value.

The above structure allows for highly accurate detection of a change amount for each of the first and second element data, in which the additional information is embedded.

A fifth aspect of the present invention provides an information-detecting apparatus in which the detecting unit compares the change amount with a predetermined threshold, thereby detecting the additional information.

The above structure allows for easy determination of a value of bit information included in the embedded additional information.

A sixth aspect of the present invention provides an information-detecting apparatus in which the second selecting units selects, as the neighboring data, element data falling within a range of eight pieces of element data centered at either the first element data or the second element data in positive and negative directions of each of orthogonal X and Y axes.

The above structure selects, as the neighboring data, element data falling within a range of being highly correlated, and the calculating unit provides calculation results closer to (double of) values of the change amount.

A seventh aspect of the present invention provides an information-detecting apparatus in which the second selecting unit selects, as the neighboring data, element data adjacent to each of the first element data and the second element data.

The above structure selects, as the neighboring data, element data falling with a range of being highly correlated, and the calculating unit provides calculation results closer to (double of) values of the change amount.

An eighth aspect of the present invention provides an information-detecting apparatus in which, assuming that the additional information is multi-bit information, and that each piece of bit information included in the additional information is embedded, for each piece of one-bit information, in each of a plurality of the data sets, the first selecting unit selects the plurality of the data sets as the target data, the second selecting unit selects the neighboring data for each of the plurality of the data sets, the calculating unit calculates the change amount for each of the plurality of the data sets, and the detecting unit determines a value of each piece of the bit information in accordance with the change amount for each of the plurality of the data sets, thereby detecting the additional information.

The above structure allows the additional information to be detected with increased accuracy, even when the embedded additional information includes multi-bit information. This means that additional information containing a large amount of information is embeddable. As a result, additional information including effective digital watermarks is utilized.

A ninth aspect of the present invention provides an information-detecting apparatus in which, assuming that the additional information is multi-bit information, and that a piece of bit information included in the additional information is embedded in a plurality of the data sets, the calculating unit calculates the change amount for each of the plurality of the data sets in which the piece of bit information is embedded, thereby calculating a sum of the calculated change amounts, and the detecting unit determines a value of the piece of bit information in accordance with the sum of the change amounts, thereby detecting the additional information.

The above structure allows the additional information to be detected with increased accuracy, even when the embedded additional information includes multi-bit information. This means that additional information containing a large amount of information is embeddable, and digital watermarks are effectively utilized.

A tenth aspect of the present invention provides an information-detecting apparatus in which, assuming a first threshold and a second threshold smaller than the first threshold, the calculating unit eliminates, from being used to calculate the sum of the change amounts, the change amount equal to or greater than the first threshold or equal to or smaller than the second threshold among the change amounts for the plurality of the data sets in which the piece of bit information is embedded.

The above structure provides the increased accuracy of the detection.

The above, and other objects, features and advantages of the present invention will become apparent from the following description read in conjunction with the accompanying drawings, in which like reference numerals designate the same elements.

BEST MODE FOR CARRYING OUT THE INVENTION

An embodiment of the present invention is now described with reference to the accompanying drawings.

Figure 1:
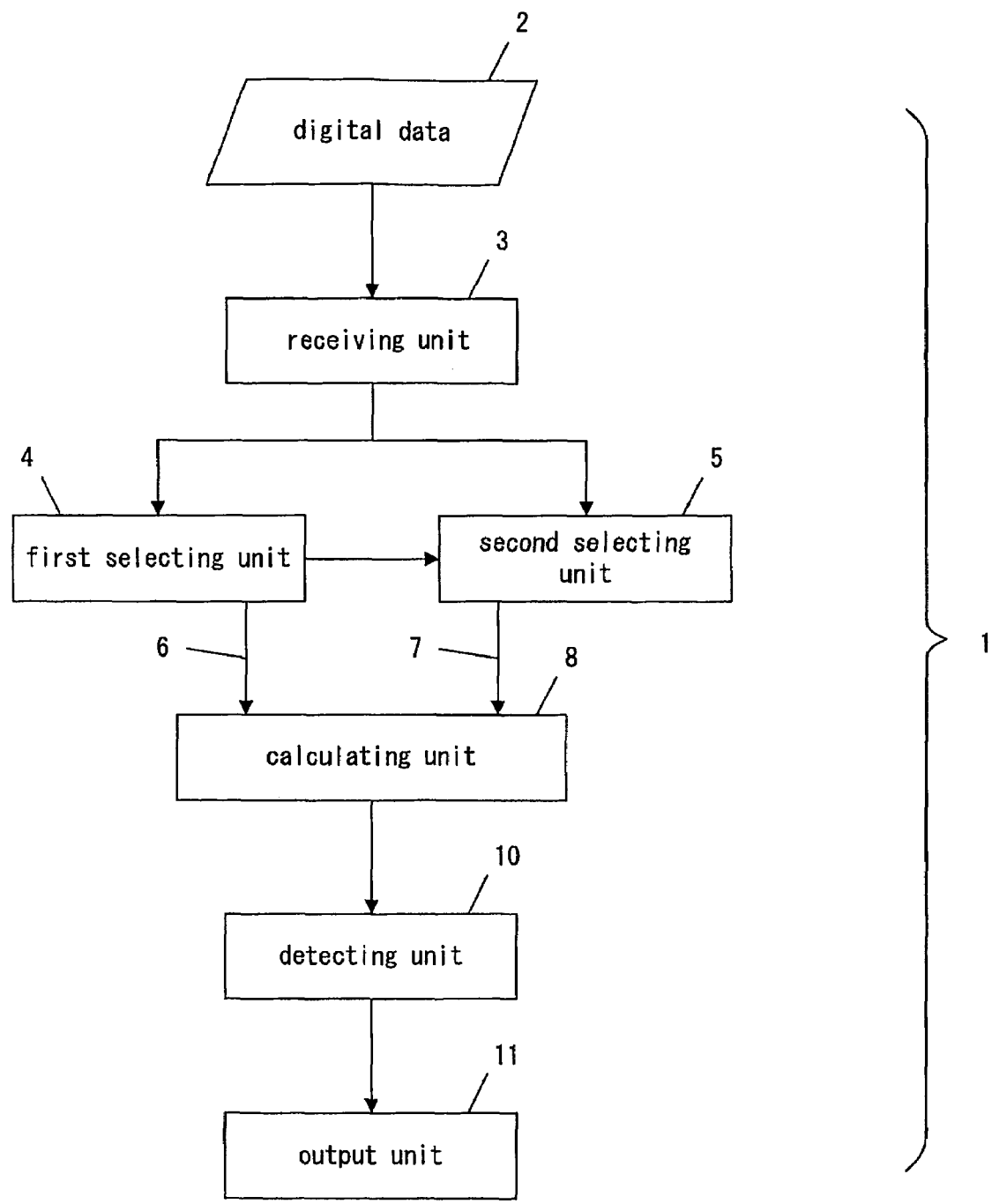
FIG. 1 is a block diagram illustrating an information-detecting apparatus according to an embodiment of the present invention.

FIG. 1 is a block diagram illustrating an information-detecting apparatus according to the present embodiment. The information-detecting apparatus 1 includes elements as discussed below.

A receiving unit 3 is operable to receive digital data 2. The digital data 2 includes several pieces of element data. As discussed later, each of first and second element data as arbitrarily selected from among the element data is changed in value, thereby embedding additional information into both of the first and second element data.

A first selecting unit 4 is operable to select, from the digital data 2, a data set that includes the first and second element data, thereby providing the selected data set as target data 6. A second selecting unit 5 is operable to select element data in the neighborhood of each of the first and second element data from the digital data 2, thereby providing the selected element data as neighboring data 7.

A calculating unit 8 is operable to calculate, based on both of the target data 6 and neighboring data 7, a change amount 9 imparted to each of the first and second element data.

A detecting unit 10 is operable to detect the additional information in accordance with the calculated change amount 9. The detected result is outputted by an output unit 11.

Figure 2:
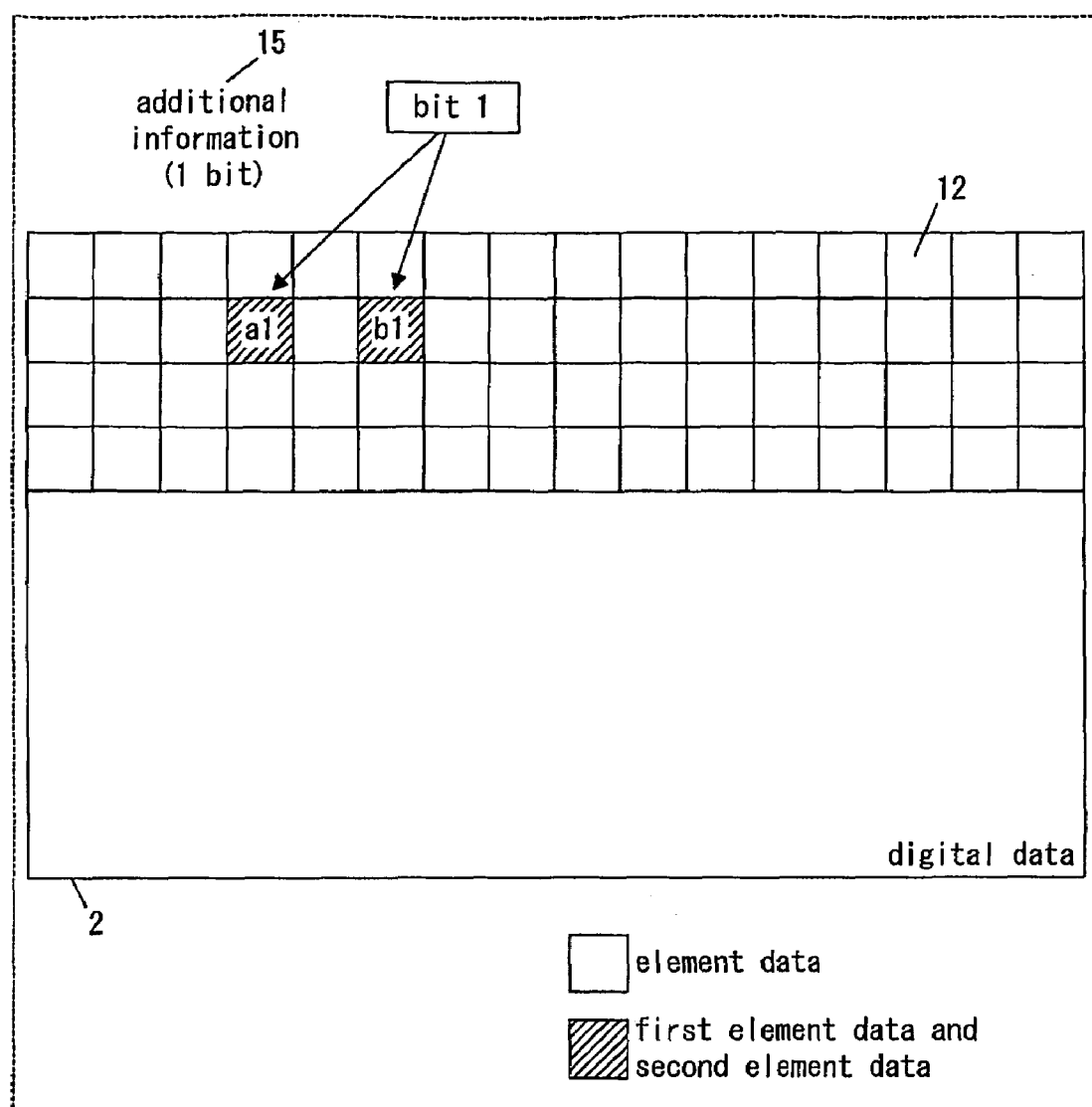
FIG. 2 is a structural illustration showing a piece of digital data according to the embodiment.
Figure 3:
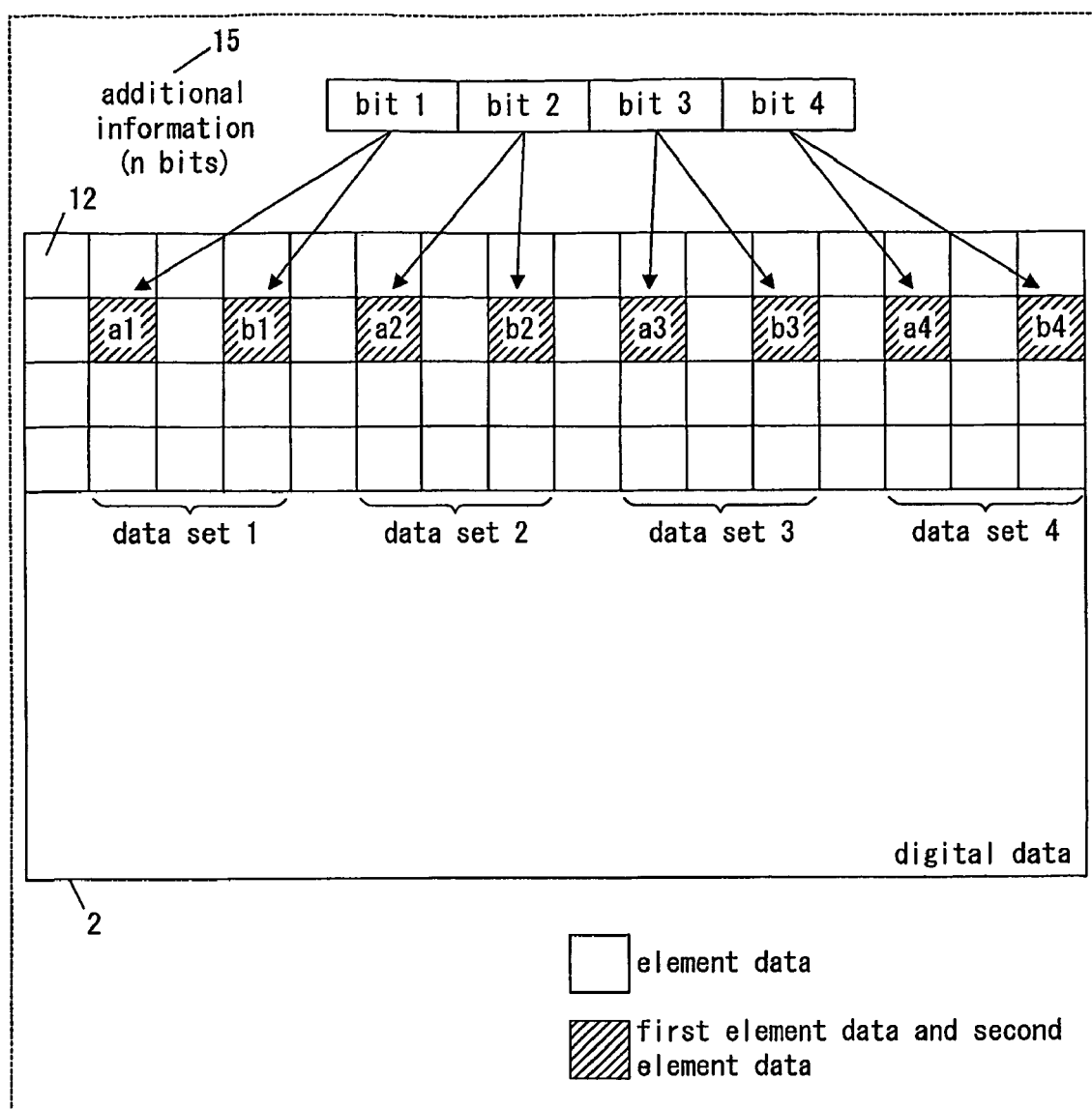
FIG. 3 is a structural illustration showing another piece of digital data according to the embodiment.
Figure 4:
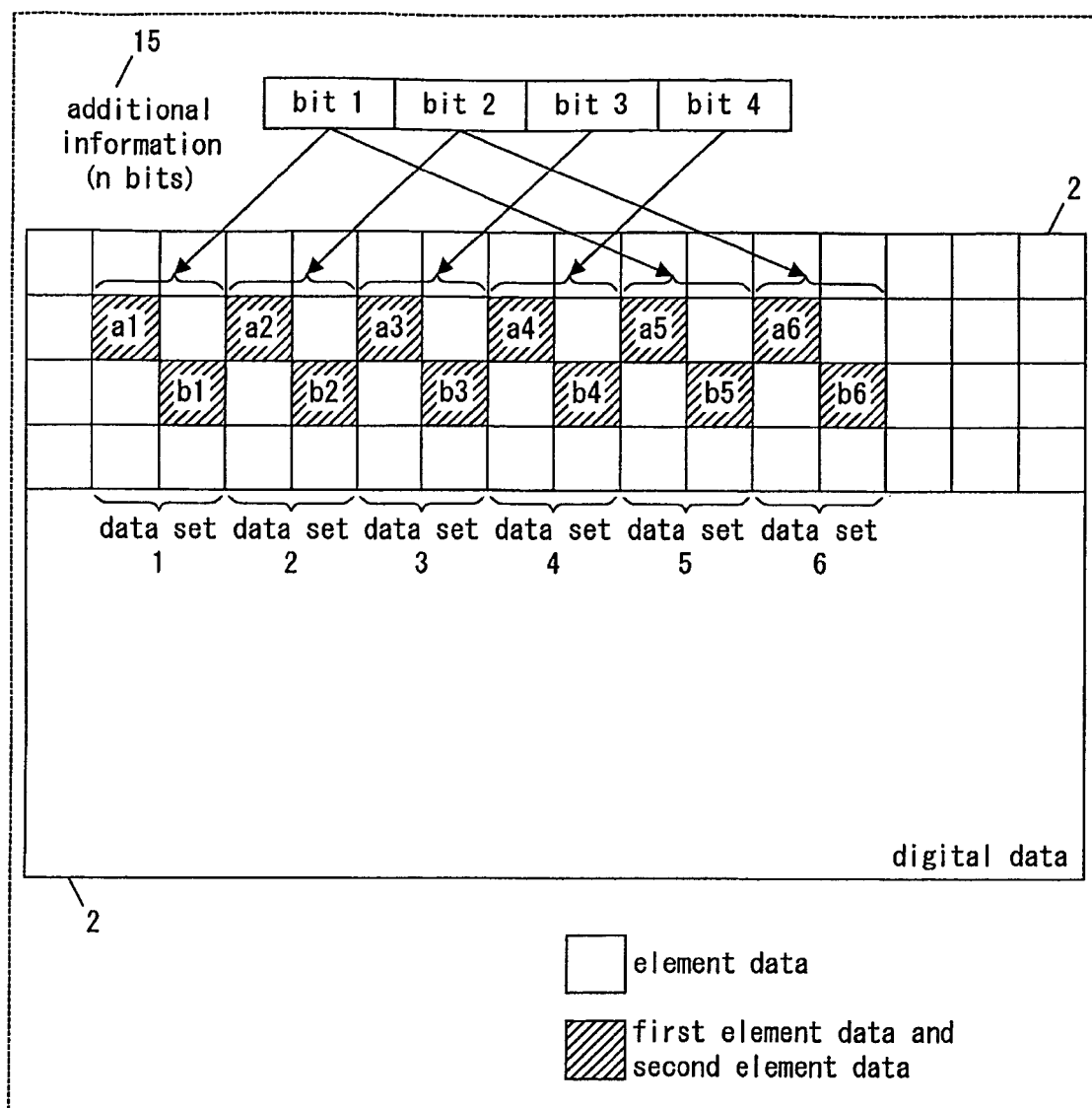
FIG. 4 is a structural illustration showing a further digital data according to the embodiment.

The following discusses, with reference to FIGS. 2 to 4, processing in which the additional information is embedded into the digital data 2.

FIGS. 2, 3, and 4 are structural illustrations showing the digital data according to the present embodiment.

The digital data 2 forms digital content such as image data and audio data. In particular, image data having digital watermarks embedded therein are preferably used.

The digital data 2 includes several pieces of element data 12. The additional information 15 includes either one-bit information or multi-bit information. Referring to FIG. 2, the additional information 15 is shown including one-bit information made of a bit 1.

In FIG. 2, the digital data 2 is shown having the additional information 15 (which includes the one-bit information) embedded in first element data "a1" and second element data "b1". The first and second element data "a1", "b1" as arbitrarily selected from among the several pieces of element data 12 are set as a data set. Each of the first and second element data "a1", "b1" is changed in data value in accordance with a value of the bit 1 of the additional information 15. More specifically, when the bit 1 has the value of "0", then the first element data "a1" is increased by the amount of change amount $\alpha$ ($\alpha > 0$), while the second element data "b1" is decreased thereby. Conversely, when the bit 1 has the value of "1", then the first element data "a1" is decreased by the amount of the change amount $\alpha$, while the second element data "b1" is increased thereby. Imparting the change amount $\alpha$ embeds the one-bit additional information 15 into the digital data 2. This means that the one-bit information is embedded into the data set that includes the first and second element data.

The following discusses, with reference to FIG. 3, a pattern in which additional information 15 that includes multi-bit information is embedded into the digital data 2.

In FIG. 3, the additional information 15 is four-bit information made of a bit 1 to a bit 4. The bit 1 has information embedded in a data set 1 that includes first element data "a1" and second element data "b1". Similarly to the case where the additional information 15 is one-bit information, the first and second element data "a1", "b1" are increased and decreased by the amount of the change amount $\alpha$ in accordance with a value of the bit 1.

The bit 2 has information embedded in a data set 2 that includes first element data "a2" and second element data "b2". The bit 3 has information embedded in a data set 3 that includes first element data "a3" and second element data "b3". The bit 4 has information embedded in a data set 4 that includes first element data "a4" and second element data "b4".

The embedment of the four-bit additional information 15 into the digital data 2 as illustrated in FIG. 3 stores, as digital watermarks for example, a greater quantity of information than that of the one-bit additional information 15.

Alternatively, as shown in FIG. 4, the same four-bit additional information 15 may be embedded into a greater number of data sets.

The bit 1 has information embedded in both of the data set 1 (which includes the first and second element data "a1", "b1") and a data set 5 that includes first element data "a5" and second element data "b5". Alternatively, the information of the bit 1 may be embedded into a still greater number of data sets. Similarly, the remaining bits 2 to 4 may be embedded in the manners as just discussed.

The embedment of the one-bit information into several data sets as illustrated in FIG. 4 detects the information with enhanced accuracy as discussed later.

Although the additional information 15 including the four-bit information is described only by way of illustration in FIGS. 3 and 4, any other number of bits may be used.

The digital data 2 includes a variety of data such as image data and audio data. When the digital data 2 is image data, each of the first and second element data includes either a piece of pixel data or several pieces of pixel data. In other words, each of the first and second element data may be formed by a piece of pixel data, or alternatively may be formed by several pieces of pixel data.

The following discusses processing in which the embedded additional information as just described is detected.

As illustrated in FIG. 1, the receiving unit 3 receives the digital data 2.

Figure 5:
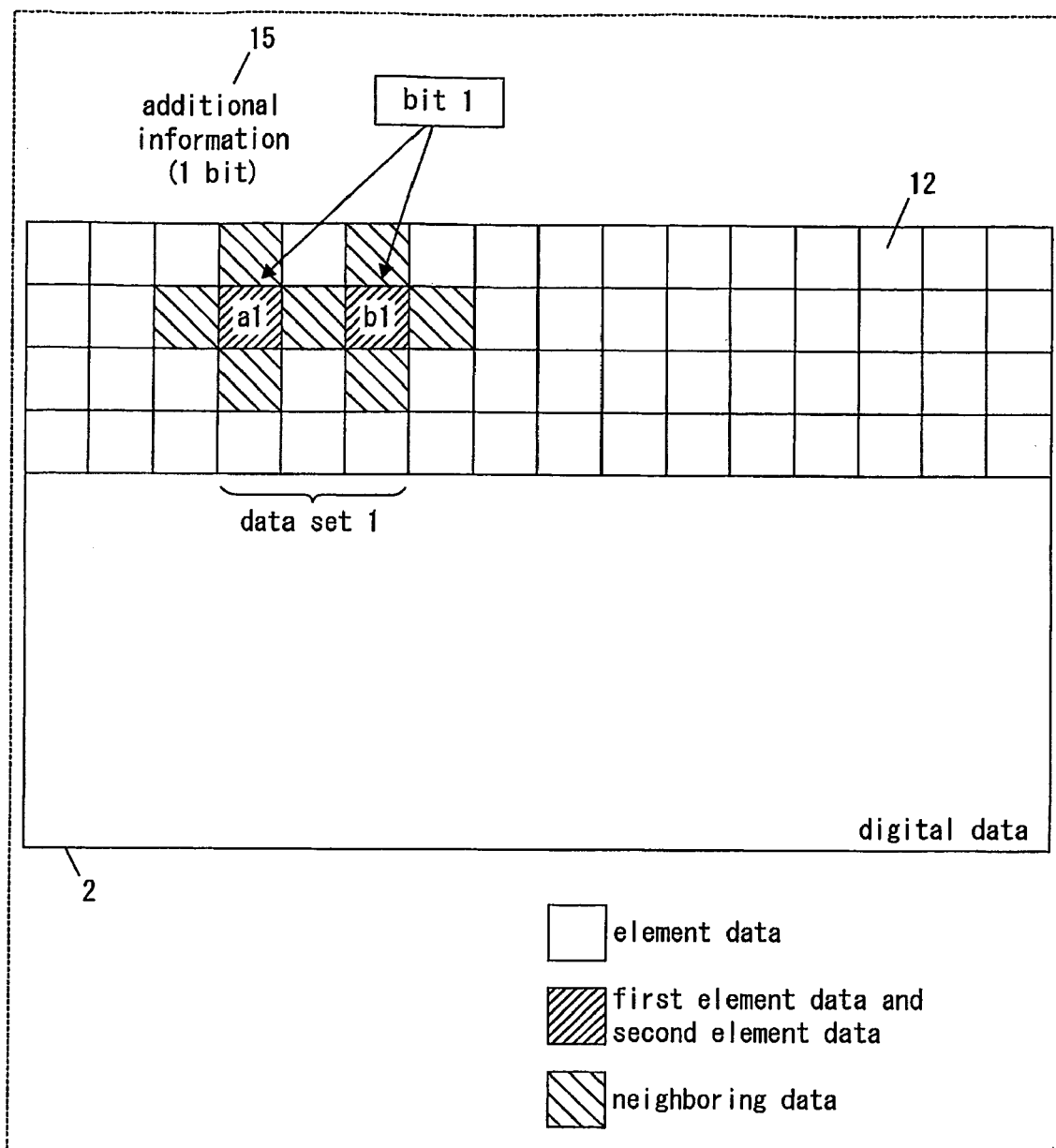
FIG. 5 is a structural illustration showing a yet further digital data according to the embodiment.
Figure 6:
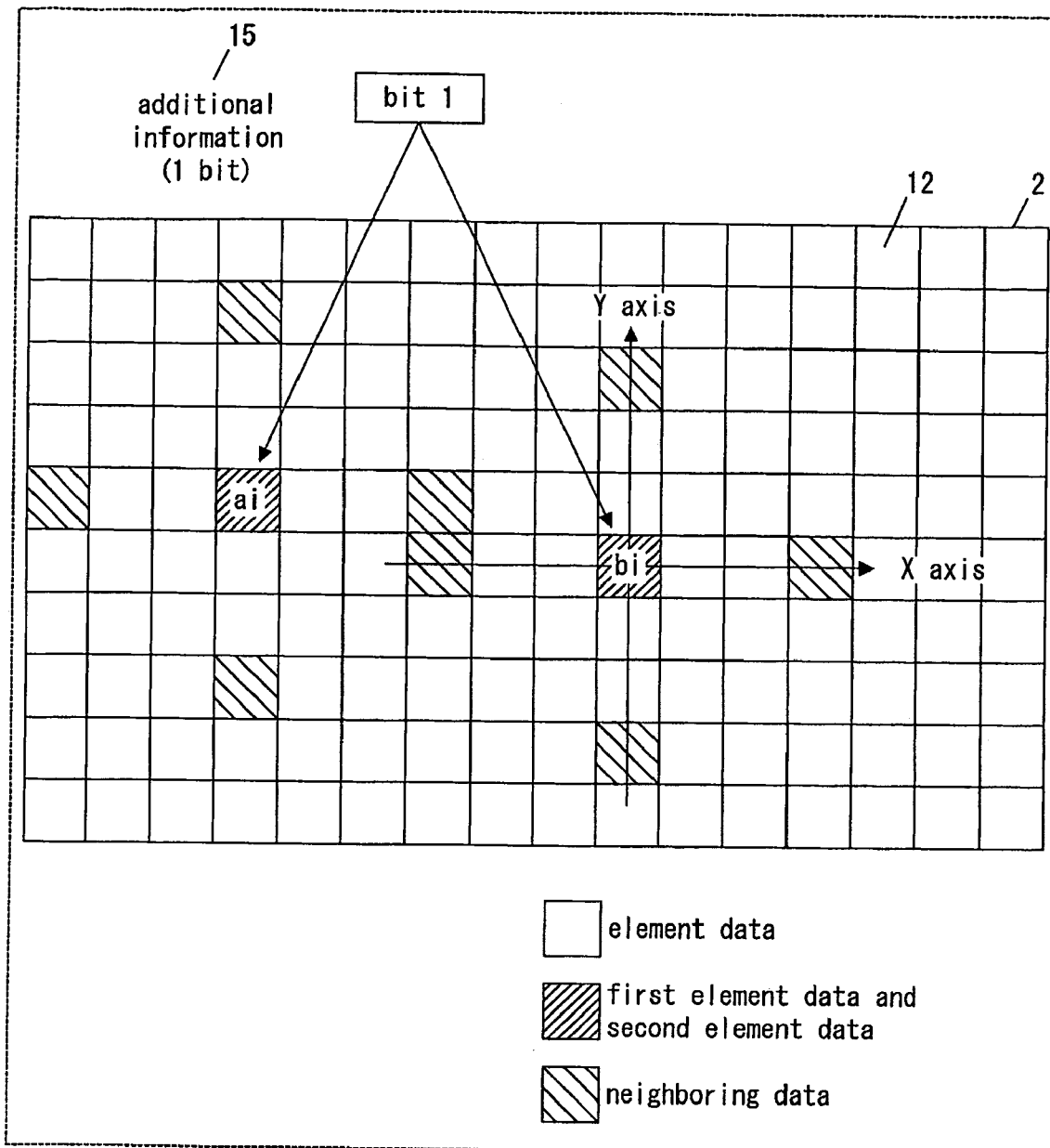
FIG. 6 is a structural illustration showing a piece of digital data according to the embodiment.
Figure 7:
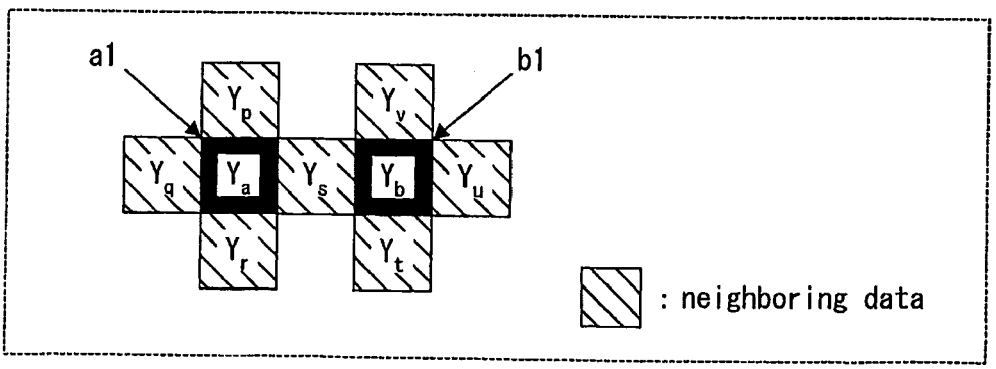
FIG. 7 is a structural illustration showing part of another piece of digital data according to the embodiment.

Now, assume that the additional information 15 is embedded in the digital data 2. The following discusses the case where the additional information 15 is one-bit information as illustrated in FIGS. 5 to 7. FIGS. 5 and 6 are structural illustrations showing the digital data according to the present embodiment.

The first selecting unit 4 selects, as target data 6, the data set 1 that includes the first and second element data "a1", "b1", from the digital data 2 received by the receiving unit 3. The information-detecting apparatus 1 possesses information on respective positions of the first and second element data. When the digital data 2 is image data, each of the first and second element data "a1", "b1" includes either a piece of pixel data or several pieces of pixel data.

The second selecting unit 5 selects, as neighboring data 7, element data 12 in the neighborhood of each of the first and second element data "a1", "b1". Referring to FIG. 5, the shaded element data 12 are shown selected as the neighboring data 7.

As illustrated in FIG. 6, element data lying within the range of eight pieces of element data centered at each of the first and second element data "a1", "b1" in the positive and negative directions of each of the orthogonal X and Y axes are selected as the neighboring data 7. In FIG. 6, several pieces of element data spaced apart from the first element data "a1" by the distance of three pieces of element data in the negative and positive directions of each of the X- and Y-axis are selected as neighboring data 7 centered at the first element data "a1". Similarly, several pieces of element data spaced apart from the second element data "b1" by the distance of three pieces of element data in the negative and positive directions of each of the X- and Y-axis are selected as neighboring data 7 centered at the second element data "b1".

Alternatively, several pieces of element data adjacent to each of the first and second element data "a1", "b1" as shown in FIG. 5 may, of course, be selected as the neighboring data 7 as well.

Since the several pieces of element data within the range of the eight pieces of element data in the positive and negative directions of each of the X- and Y-axis are selected as the neighboring data 7, element data falling within a range of being highly correlated in an image are selected as the neighboring data 7. This is because it is considered that the target data 6 and neighboring data 7 are highly correlated with one another when they lie within the range of being partitioned by the eight pieces of element data. Similarly, for example, in the processing of image compression, when being present within the range of eight pixels in the positive and negative directions, the neighboring data 7 falls within the range of one macro block, and it is considered that the target data 6 and neighboring data 7 lie within a range of being highly correlated with one another.

The calculating unit 8 calculates, based on the target data 6 and neighboring data 7, a change amount imparted to each of the first and second element data "a1", "b1". At this time, the calculating unit 8 initially calculates an estimated change amount "S" for estimating the imparted change amount.

FIG. 7 is an illustration showing part of the digital data according to the present embodiment.

FIG. 7 illustrates a luminance value of each piece of the target data 6 (the first and second element data "a1", "b1"), and that of each piece of the neighboring data 7 centered at each of the first and second element data "a1", "b1". A luminance value of the first element data "a1" and that of the second element data "b1" are denoted by "Ya" and "Yb", respectively. Respective luminance values of the several pieces of neighboring data 7 lying in the neighborhood of the first element data "a1" are denoted by "Yp", "Yq", "Yr", and "Ys". Respective luminance values of the several pieces of neighboring data 7 in the neighborhood of the second element data "b1" are denoted by "Ys", "Yt", "Yu", and "Yv". The use of the luminance values allows the estimated change amount "S" as discussed above to be expressed by (Equation 3).

$$S = \left(Y_a - \frac{Y_p + Y_q + Y_r + Y_s}{4}\right) - \left(Y_b - \frac{Y_s + Y_t + Y_u + Y_v}{4}\right) \quad \text{(Equation 3)}$$

As illustrated by (Equation 3), the calculating unit 8 initially calculates, as a first difference value, the value of a difference in luminance value between the first element data "a1" and the neighboring data centered at the first element data "a1" (i.e., the element data arranged near the "a1") or in short, the value of a difference between luminance value "Ya" and those "Yp", "Yq", "Yr", and "Ys". Similarly, the calculating unit 8 calculates, as a second difference value, the value of a difference in luminance value between the second element data "b1" and the neighboring data centered at the second element data "b1" (i.e., the element data arranged near the "b1") or in short, the value of a difference between the luminance value "Yb" and those "Ys", "Yt", "Yu", and "Yv". The calculating unit 8 ultimately calculates the value of a difference between the first and second difference values, thereby providing the estimated change amount "S".

Now, assume that the change amount has a value of "α" when the additional information 15 is embedded. When the additional information 15 includes bit information having the value of "0", then (Equation 3) is approximated by (Equation 4). With the bit information having the value of "0", the first element data "a1" is increased by the amount of change amount α, while the second element data "b1" is decreased thereby.

$$S = \left(Y_a - \frac{Y_p + Y_q + Y_r + Y_s}{4}\right) - \left(Y_b - \frac{Y_s + Y_t + Y_u + Y_v}{4}\right) \quad \text{(Equation 4)}$$

$$= \left(Y_{a0} + \alpha - \frac{Y_p + Y_q + Y_r + Y_s}{4}\right) - \left(Y_{b0} - \alpha - \frac{Y_s + Y_t + Y_u + Y_v}{4}\right)$$

$$\approx 2\alpha \because Y_{a0} \approx \frac{Y_p + Y_q + Y_r + Y_s}{4}, Y_{b0} \approx \frac{Y_s + Y_t + Y_u + Y_v}{4}$$

Since the target data 6 is highly correlated with the neighboring data 7, the value of "$2\alpha$", double as high as the change amount $\alpha$, is calculated as illustrated in (Equation 4). Conversely, when the bit information has the value of "1", then the value of "$-2\alpha$" is calculated. This means that there is calculated a value to estimate the change amount "$\alpha$" when the additional information 15 is embedded into the digital data 2.

The detecting unit 10 compares the calculated value "$2\alpha$" (or otherwise the value "$-2\alpha$") with a predetermined threshold "T" ($T \geq 0$). When the value "$2\alpha$" is greater than the threshold "T", then bit information included in the one-bit additional information 15 has the value of "0". When the value "$-2\alpha$" is smaller than the threshold "$-T$", then the bit information has the value of "1". In short, the detecting unit 10 detects a value of the one-bit additional information 15.

The detecting unit 10 feeds the detection result or the value of the additional information 15 into the output unit 11. The output unit 11 feeds the detection result into a display unit. As a result, the additional information 15 embedded in the digital data 2 is rendered visible. When the additional information 15 is a digital watermark, users in receipt of the digital data 2 is able to view the digital watermark through the digital data 2.

Figure 8:
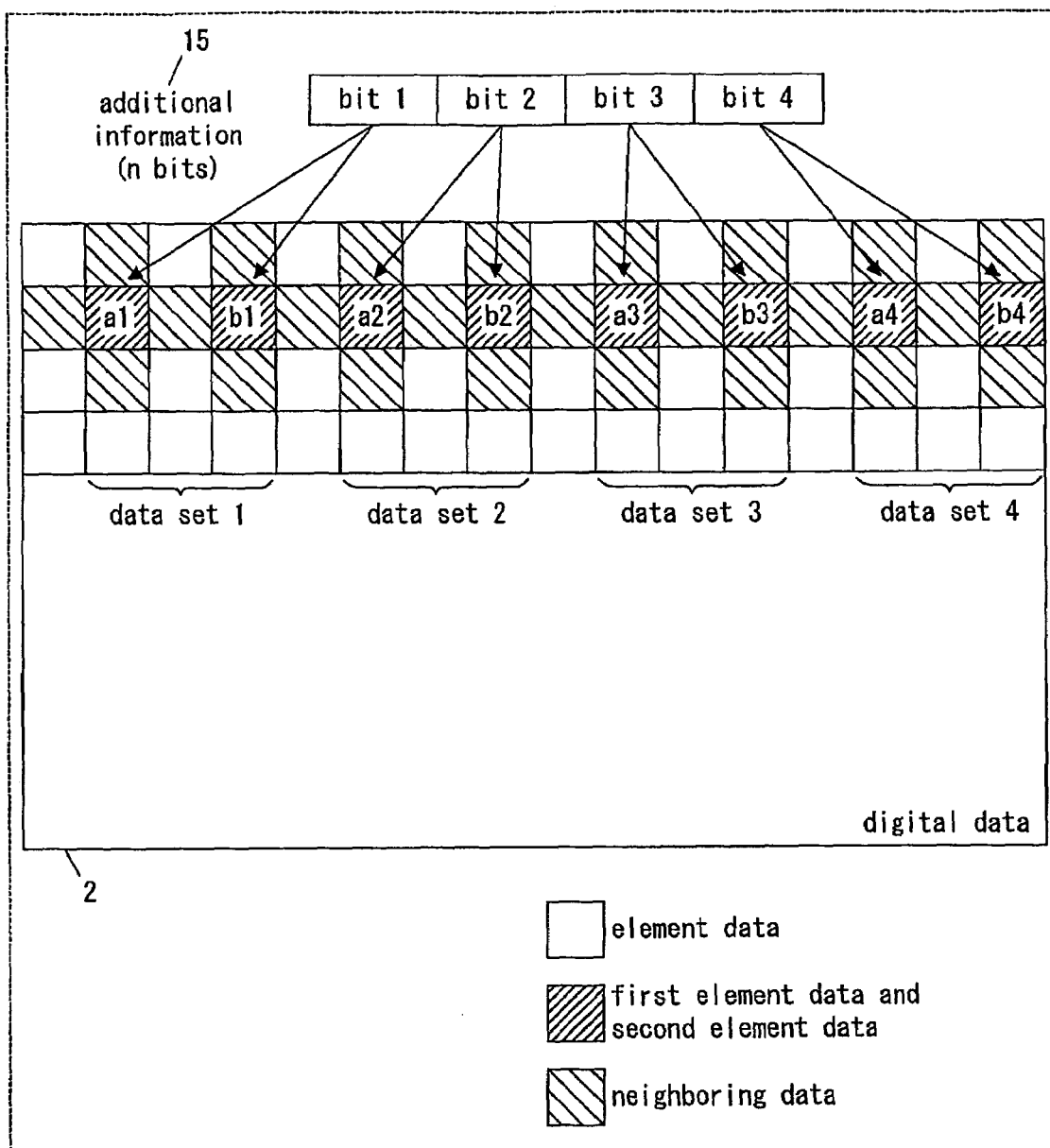
FIG. 8 is a structural illustration showing a further digital data according to the embodiment.
Figure 9:
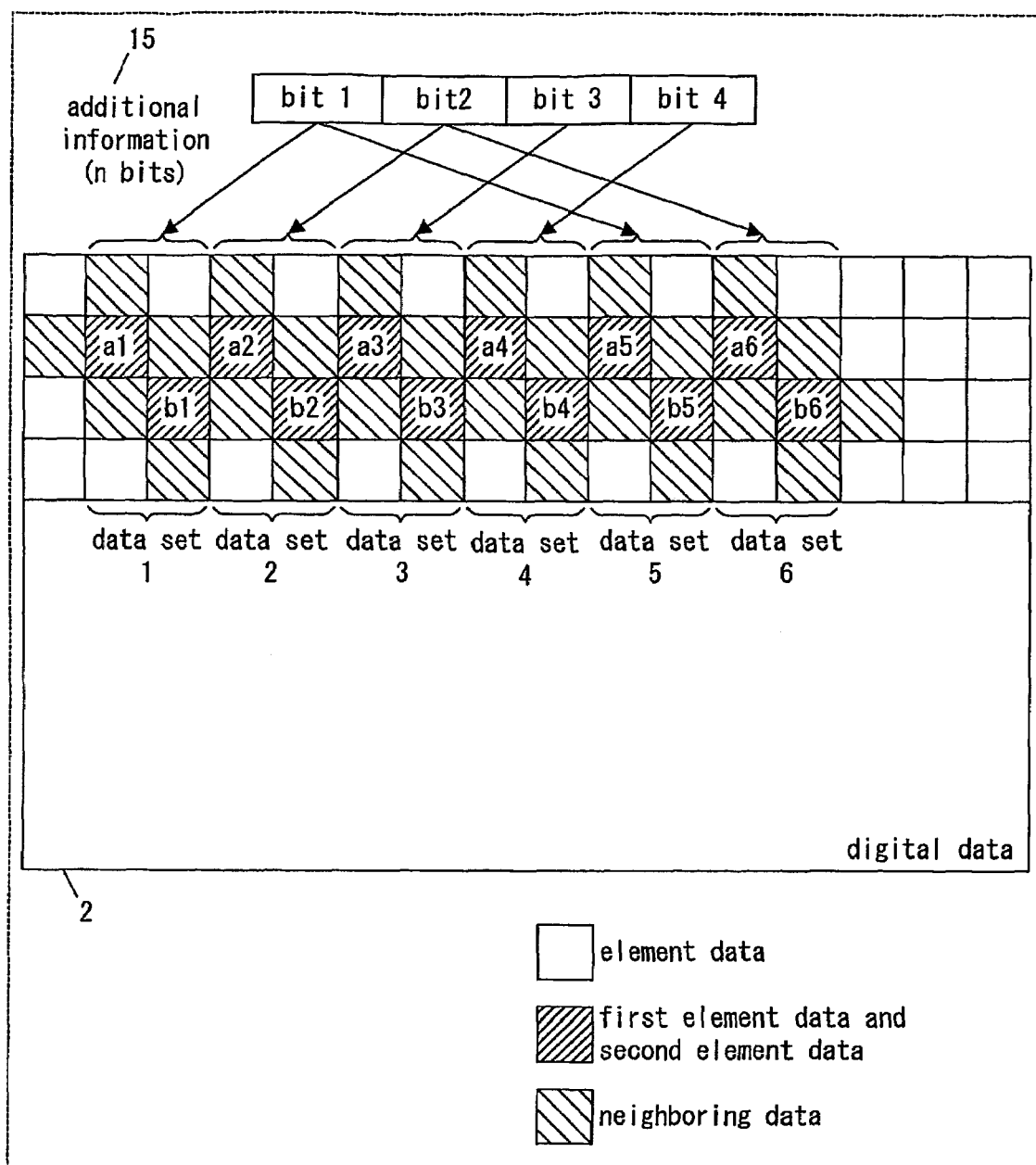
FIG. 9 is a structural illustration showing a still further digital data according to the embodiment.

The following discusses the detection of multi-bit additional information 15 with reference to FIGS. 8 and 9.

FIGS. 8 and 9 are structural illustration showing the digital data according the present embodiment.

When the additional information 15 includes multi-bit information, then the multi-bit information is embedded, for each piece of bit information, in several data sets as illustrated in FIGS. 3 and 4.

Referring to the digital data 2 of FIG. 8, four-bit information is shown embedded for each piece of bit information in four data sets, i.e., data sets 1 to 4. In other words, a predetermined change amount has been imparted to each of the first element data "a1" to "a4" and the second element data "b1" to "b4" included in the data sets 1 to 4. Assume that the change amount has a value of "$\alpha$".

The first selecting unit 4 selects each of the four data sets (the data sets 1 to 4) as target data 6. The second selecting unit 5 selects, as neighboring data 7, element data lying in the neighborhood of each of the data sets 1 to 4.

The calculating unit 8 calculates an estimated change amount for each of the data sets on the basis of the target data 6 and neighboring data 7. The estimated change amount for each of the data sets is determined by (Equation 3). (Equation 3) is approximated by (Equation 4). Assume that, for bit information having the value of "0", the first element data is increased by the amount of a change amount $\alpha$ ($\alpha > 0$), but the second element data is decreased thereby. In this instance, (Equation 4) is approximated by the value of "$2\alpha$" for each of the data sets in which the bit information having the value of "0" is embedded. In the meanwhile, (Equation 4) is approximated by the value of "$-2\alpha$" for each of the data sets in which the bit information having the value of "1" is embedded. Similarly to the detection of the one-bit additional information 15, the results from (Equation 4) are compared with a predetermined threshold, thereby detecting a value of the additional information 15.

For example, assume that the value of "$2\alpha$" is figured out from estimated change amounts S1 and S3 for the data sets 1 and 3, respectively. Further assume that the value of "$-2\alpha$" is figured out from estimated change amounts S2 and S4 for the data sets 2 and 4, respectively. The detecting unit 10 compares the values of "$2\alpha$" and "$-2\alpha$" with thresholds "T" ($T \geq 0$) and "$-T$", respectively. As a result of the comparison, a value of bit information embedded in each of the data sets is determined. According to the present embodiment, it is determined that each of bits 1 and 3 has the value of "1", while each of bits 2 and 4 has the value of "0". This means that the information-detecting apparatus 1 detects the additional information 15 as the value of "1010".

As illustrated in FIG. 9, a value of the additional information 15 is determined on the basis of a sum of estimated change amounts for several data sets when one-bit information is embedded into the several data sets as illustrated in FIG. 4.

When the one-bit information is embedded in the several data sets, the first selecting unit 4 selects the several data sets as target data 6. The second selecting unit 5 selects, as neighboring data 7, element data arranged in the neighborhood of each of the several data sets. The selected target data 6 and neighboring data 7 are illustrated in FIG. 9. Although only the data sets 1 to 6 are illustrated for convenience in FIG. 9, a greater number of data sets may be illustrated.

The calculating unit 8 calculates an estimated change amount for each of the data sets 1 to 6 or more. The estimated change amounts are calculated by (Equation 3), and are approximated by (Equation 4).

The detecting unit 10 calculates a sum of the estimated change amounts calculated for the data sets 1 and 5 in which the same information of bit 1 is embedded. Similarly, the detecting unit 10 calculates a sum of the estimated change amounts for the other pieces of bit information (bit 2 to bit 4).

The detecting unit 10 compares the calculated sum of the estimated change amounts with a predetermined threshold, thereby determining a value of each piece of bit information. A determination is made as to values of all pieces of the bit information included in the additional information 15, thereby ultimately detecting the additional information 15.

In this way, a piece of bit information is detected using a large number of data sets, and consequently the estimated change amount is calculated with high accuracy. For example, when the first and second element data included in a data set, and neighboring data centered at each of the first and second element data are less correlated with each other, then an estimated change amount deviated from the original change amount $\alpha$ is calculated. Irrespective of the occurrence of the deviation, however, a sum of estimated change amounts for several data sets is calculated, and consequently the calculated sum approaches the original change amount α. As a result, the additional information 15 is detected with increased accuracy.

Alternatively each value of estimated change amounts for the data sets having the same bit information embedded therein is compared with a threshold value before the summation, whereby data set-related, estimated change amounts materially deviated from the change amount α are eliminated from being used to calculate the sum.

For example, assume that the bit 1 has information embedded in each of the data sets 1, 5, 9 (not shown), and 13 (not shown).

Assume that estimated change amounts having the values of "5", "1", "7", and "13" are calculated for the data sets 1, 5, 9, and 13, respectively. At this time, assume that first and second thresholds have the values of "8" and "2", respectively. When the calculated estimated change amount is equal to or greater than the first threshold, it is considered that target data 6 and neighboring data 7 centered thereat in a data set, from which the estimated change value is to be calculated, are less correlated with one another. Similarly, when the calculated estimated change amount is equal to or smaller than the second threshold, it is considered that the target data 6 and neighboring data 7 centered thereat in a data set, from which the estimated change amount is calculated, are less correlated with one another.

Any estimated change amount considerably deviated from other estimated change amounts because of such a low correlation is eliminated from being used to calculate a sum of the estimated change amounts. According to the present embodiment, the estimated change amounts for both of the data sets 5 and 13 are eliminated. The elimination of the estimated change amounts for the data sets 5 and 13 renders the calculated sum closer to the change amount α. As a result, the additional information 15 is detected with increased accuracy.

The information-detecting apparatus according to the present invention provides a change amount distributed into two pieces of element data or the first and second element data, and consequently provides a smaller change amount for each piece of element data. As a result, degradation and change in digital data is suppressed, which otherwise would be rendered conspicuous as a result of imparting the change amount.

The neighboring element data in addition to the first and second element data, to each of which the change amount is imparted, are also used to calculate the estimated change amounts, and a greater number of pieces of highly correlated element data are used. As a result, the calculated estimated change amount becomes closer to the change amount α. Accordingly, an accurate determination is made as to a value of bit information, and the additional information 15 is detected with increased accuracy.

The one-bit information can be embedded into only either a single or several data sets, and a greater amount of additional information can be embedded into the single digital data 2. In particular, the neighboring data are used to detect the additional information, and the bit information is detected with increased accuracy, even when the one-bit information is embedded into fewer data sets. As a result, a greater amount of additional information is embedded into the single digital data 2.

According to the present embodiment, when the embedded additional information 15 includes bit information having the value of "0", then the first element data is increased by the amount of the change amount α, but the second element data is decreased thereby. Alternatively, the first element data may be decreased by the amount of the change amount α, but the second element data may be increased thereby. As a further alternative, a change amount having a different value may be imparted to each of the first and second element data. As a yet further alternative, a change amount having a different value may be imparted for each data set in which the additional information 15 is embedded.

Although it has been described that the estimated change amount is calculated in accordance with (Equation 3), this is given only by way of illustration. Different calculation methods and/or different neighboring data 7 may be selected according to the features of the digital data 2.

When the digital data 2 is image data, then each piece of the neighboring data 7 may be weighted in accordance with image features. The image features includes image complexity and edge orientations.

To detect the multi-bit additional information 15, several candidates for values of the additional information may be nominated, thereby eventually determining an additional information value.

The information-detecting apparatus 1 may be either wholly or partly realized by hardware or otherwise software.

When the information-detecting apparatus 1 is realized by software, then elements as discussed below are included. At a receiving step, digital data is received. At a first selection step, the first and second element data are selected as target data. At a second selection step, element data in the neighborhood of each of the first and second element data are selected as neighboring data. At a calculation step, a change amount is calculated based on both of the target data and the neighboring data. At the final step of detection, additional information is detected in accordance with the change amount.

The above steps may alternatively be achieved by computer programs. The computer programs stored in a recoding medium may be distributed. The recording medium includes a floppy disk (a registered trademark), a CD-ROM, a DVD, and a mini-disc, and the like. In addition to the above steps, the computer programs may include other steps associated with the above steps.

Figure 10:
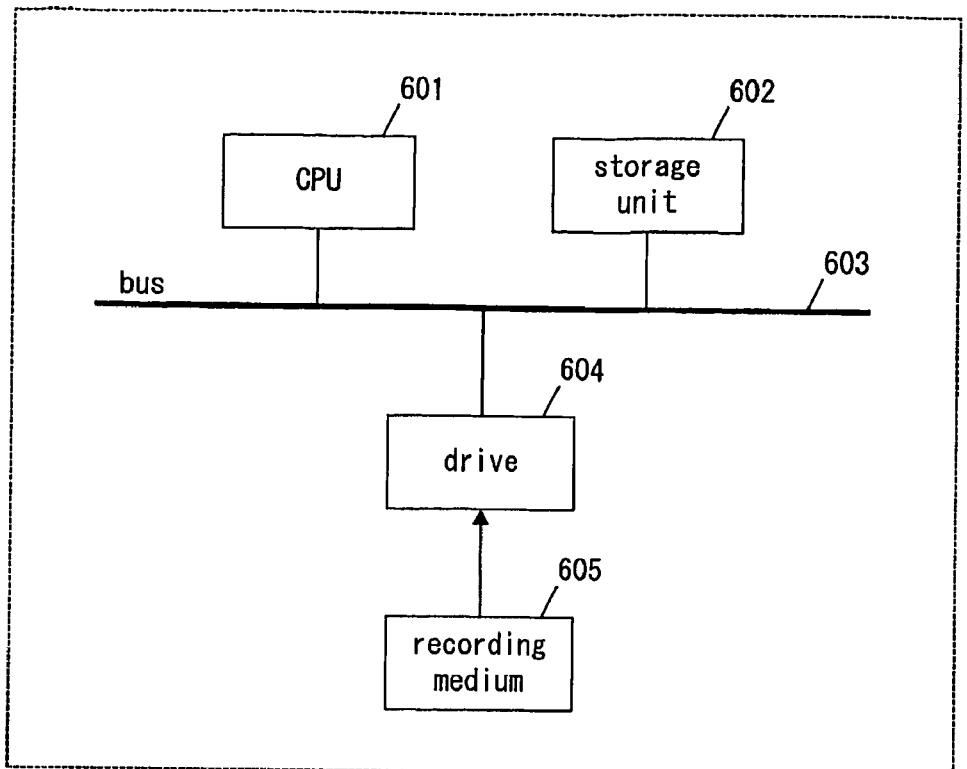
FIG. 10 is a block diagram illustrating an electronic apparatus according to the embodiment.
Figure 11:
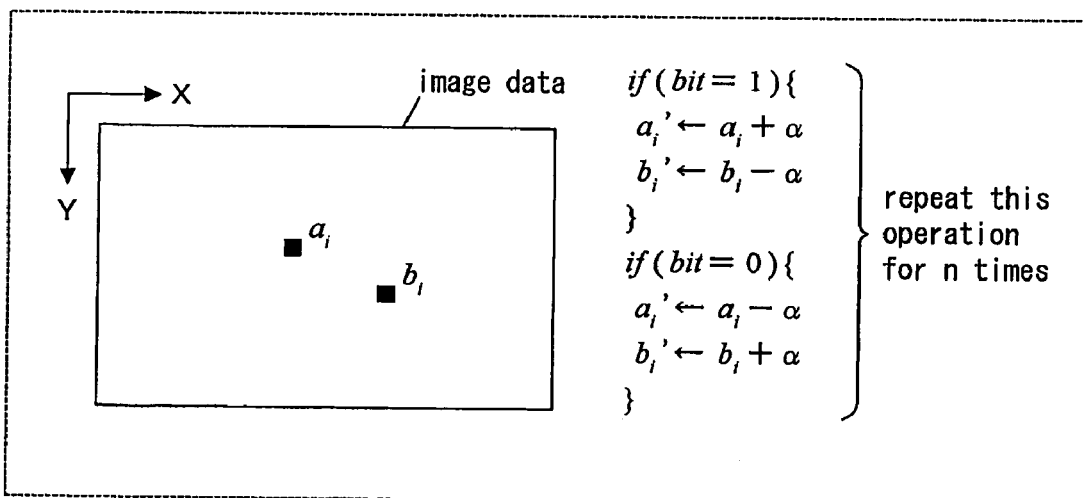
FIG. 11 is a pattern diagram illustrating a prior art digital watermark system.
Figure 12:
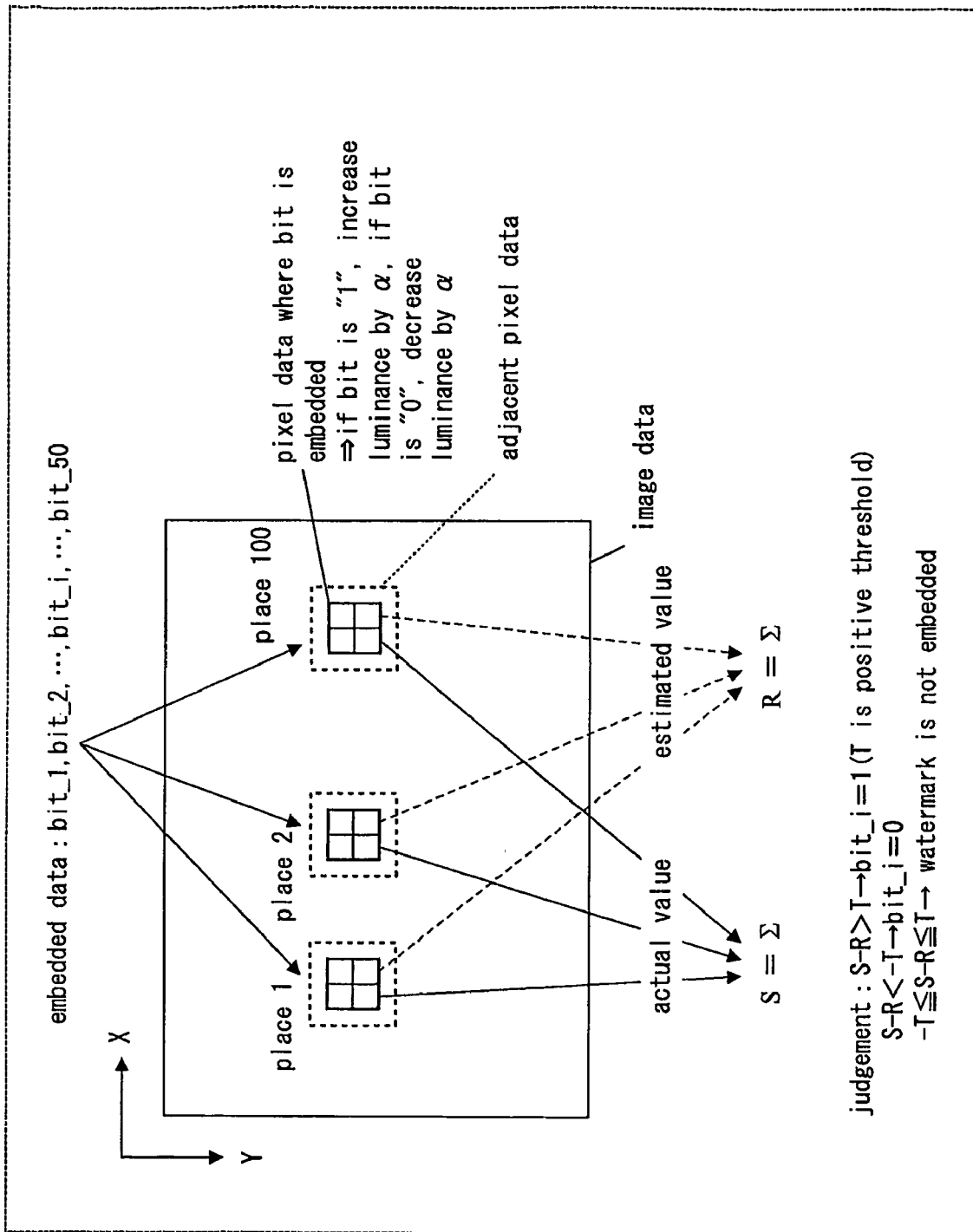
FIG. 12 is a pattern diagram illustrating the determination of additional information as disclosed by Reference No. 2.

The information-detecting apparatus and method according to the present invention can be alternatively realized by an electronic apparatus constructed as illustrated in, e.g., FIG. 10. FIG. 10 is a block diagram illustrating the electronic apparatus according to the present embodiment.

A storage unit 602 is operable to store predetermined program data. A CPU 601 is operable to execute the stored program data. The program data functions to execute a course of processing to detect the additional information. The program data may be loaded out of a recording medium 605 (an external medium) such as the DVD and CD-ROM.

Pursuant to the present invention, the additional information can be embedded into the digital data, while any change and degradation from the original digital data are suppressed.

Furthermore, pursuant to the present invention, the embedded additional information is detected with increased accuracy. As a result, additional information containing a large amount of information is embeddable as well.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

INDUSTRIAL APPLICABILITY

The present invention finds preferred applications in, e.g., electronic devices operable to regenerate digital content in which digital watermarks must be embedded.

The invention claimed is:

1. An information-detecting apparatus comprising:
a receiving unit operable to receive digital data that includes several pieces of element data, in which a change amount is imparted to a value of each of first element data and second element data among the several pieces of element data, thereby embedding additional information into both of the first element data and the second element data;
a first selecting unit operable to select, as target data, a data set that includes the first element data and the second element data;
a second selecting unit operable to select, as neighboring data, element data in proximity to each of the first element data and the second element data;
a calculating unit operable to calculate, based on both of the target data and the neighboring data, the change amount imparted to each of the first element data and the second element data; and
a detecting unit operable to detect the additional information in accordance with the change amount.

2. An information-detecting apparatus as defined in claim 1, wherein when the digital data is image data, each of the first element data and the second element data comprises one of a piece of pixel data and several pieces of pixel data.

3. An information-detecting apparatus as defined in claim 1, wherein the additional information comprises a digital watermark.

4. An information-detecting apparatus as defined in claim 1, wherein said calculating unit calculates, as a first difference value, a value of a difference in data value between the first element data and the element data in proximity to the first element data, wherein said calculating unit calculates, as a second difference value, a value of a difference in data value between the second element data and the element data in proximity to the second element data, and wherein said calculating unit calculates, as the change amount, a value of a difference between the first difference value and the second difference value.

5. An information-detecting apparatus as defined in claim 1, wherein said detecting unit compares the change amount with a predetermined threshold, thereby detecting the additional information.

6. An information-detecting apparatus as defined in claim 1, wherein said second selecting units selects, as the neighboring data, element data falling within a range of eight pieces of element data centered at one of the first element data and the second element data in positive and negative directions of each of orthogonal X and Y axes.

7. An information-detecting apparatus as defined in claim 1, wherein the second selecting unit selects, as the neighboring data, element data adjacent to each of the first element data and the second element data.

8. An information-detecting apparatus as defined in claim 1, wherein assuming that the additional information is multi-bit information, and that each piece of bit information included in the additional information is embedded, for each piece of one-bit information, in each of a plurality of the data sets,
said first selecting unit selects the plurality of the data sets as the target data,
said second selecting unit selects the neighboring data for each of the plurality of the data sets,
said calculating unit calculates the change amount for each of the plurality of the data sets, and
said detecting unit determines a value of each piece of the bit information in accordance with the change amount for each of the plurality of the data sets, thereby detecting the additional information.

9. An information-detecting apparatus as defined in claim 8, wherein assuming that the additional information is multi-bit information, and that a piece of bit information included in the additional information is embedded in a plurality of the data sets,
said calculating unit calculates the change amount for each of the plurality of the data sets in which the piece of bit information is embedded, thereby calculating a sum of the calculated change amounts, and
said detecting unit determines a value of the piece of bit information in accordance with the sum of the change amounts, thereby detecting the additional information.

10. An information-detecting apparatus as defined in claim 9, wherein assuming a first threshold and a second threshold smaller than the first threshold,
said calculating unit eliminates, from being used to calculate the sum of the change amounts, the change amount equal to or greater than the first threshold or equal to or smaller than the second threshold among the change amounts for the plurality of the data sets in which the piece of bit information is embedded.

11. An information-detecting method comprising:
receiving, using a receiving unit, digital data that includes several pieces of element data, in which a change amount is imparted to a value of each of first element data and second element data among the several pieces of element data, thereby embedding additional information into both of the first element data and the second element data;
selecting, as target data, a data set that includes the first element data and the second element data;
selecting, as neighboring data, element data in proximity to each of the first element data and the second element data;
calculating, based on both of the target data and the neighboring data, the change amount imparted to each of the first element data and the second element data; and
detecting the additional information in accordance with the change amount.

12. An information-detecting method as defined in claim 11, wherein when the digital data is image data, each of the first element data and the second element data comprises one of a piece of pixel data and several pieces of pixel data.

13. An information-detecting method as defined in claim 11, wherein said calculating the change amount comprises calculating, as a first difference value, a value of a difference in data value between the first element data and the element data in proximity to the first element data, and calculating, as a second difference value, a value of a difference in data value between the second element data and the element data in proximity to the second element data, whereby a value of a difference between the first difference value and the second difference value is calculated as the change amount.

14. An information-detecting method as defined in claim 11, wherein said detecting the additional information comprises comparing the change amount with a predetermined threshold, thereby detecting the additional information.

15. An information-detecting method as defined in claim 11, wherein said selecting the element data as the neighboring data comprises selecting, as the neighboring data, element data falling within a range of eight pieces of element data centered at one of the first element data and the second element data in positive and negative directions of each of orthogonal X and Y axes.

16. An information-detecting method as defined in claim 11, wherein assuming that the additional information is multi-bit information, and that each piece of bit information included in the additional information is embedded, for each piece of one-bit information, in each of a plurality of the data sets, said selecting the data set as the target data comprises selecting the plurality of the data sets as the target data, said selecting the element data as the neighboring data comprises selecting the neighboring data for each of the plurality of the data sets, said calculating the change amount comprises calculating the change amount for each of the plurality of the data sets, and said detecting the additional information comprises determining a value of each piece of the bit information in accordance with the change amount for each of the plurality of the data sets, thereby detecting the additional information.

17. An information-detecting method as defined in claim 16, wherein assuming that the additional information is multi-bit information and that a piece of bit information included in the additional information is embedded in a plurality of the data sets, said calculating the change amount comprises calculating the change amount for each of the plurality of the data sets in which the piece of bit information is embedded, thereby calculating a sum of the calculated change amounts, and said detecting the additional information comprises determining a value of the piece of bit information in accordance with the sum of the change amounts, thereby detecting the additional information.

18. An information-detecting method as defined in claim 17, wherein assuming a first threshold and a second threshold smaller than the first threshold, said calculating the change amount comprises eliminating, from being used to calculate the sum of the change amounts, the change amount equal to or greater than the first threshold or equal to or smaller than the second threshold among the change amounts for the plurality of the data sets in which the piece of bit information is embedded.

19. A computer-readable storage medium storing computer program data that when executed by a computer, causes the computer to perform a method comprising:

receiving, using a receiving unit, digital data that includes several pieces of element data, in which a change amount is imparted to a value of each of first element data and second element data among the several pieces of element data, thereby embedding additional information into both of the first element data and the second element data;

selecting, as target data, a data set that includes the first element data and the second element data;

selecting, as neighboring data, element data in proximity to each of the first element data and the second element data;

calculating, based on both of the target data and the neighboring data, the change amount imparted to each of the first element data and the second element data; and detecting the additional information in accordance with the change amount.

* * * * *